(12) United States Patent
Khullar et al.

(10) Patent No.: US 11,437,039 B2
(45) Date of Patent: Sep. 6, 2022

(54) INTELLIGENT SOFTWARE AGENT

(71) Applicant: Apple Inc., Cupertino, CA (US)

(72) Inventors: Siddharth Khullar, Santa Clara, CA (US); Abhishek Sharma, Sunnyvale, CA (US); Jerremy Holland, Sunnyvale, CA (US); Nicholas E. Apostoloff, San Jose, CA (US); Russell Y. Webb, San Jose, CA (US); Tai-Peng Tian, Cupertino, CA (US); Tomas J. Pfister, Foster City, CA (US)

(*) Notice: Subject to any disclaimer, the term of this patent is extended or adjusted under 35 U.S.C. 154(b) by 28 days.

(21) Appl. No.: 17/132,439

(22) Filed: Dec. 23, 2020

(65) Prior Publication Data

US 2021/0166691 A1 Jun. 3, 2021

Related U.S. Application Data

(63) Continuation of application No. 16/315,864, filed as application No. PCT/US2017/040358 on Jun. 30, 2017, now Pat. No. 10,885,915.

(60) Provisional application No. 62/361,160, filed on Jul. 12, 2016.

(51) Int. Cl.
| | | |
|---|---|---|
| *G10L 15/08* | (2006.01) | |
| *G10L 15/22* | (2006.01) | |
| *G10L 15/18* | (2013.01) | |
| *G10L 15/26* | (2006.01) | |
| *G06V 40/16* | (2022.01) | |

(52) U.S. Cl.
CPC .......... *G10L 15/22* (2013.01); *G06V 40/174* (2022.01); *G10L 15/1815* (2013.01); *G10L 15/26* (2013.01); *G10L 2015/223* (2013.01)

(58) Field of Classification Search
CPC ................................ G10L 15/08; G10L 17/22
See application file for complete search history.

(56) References Cited

U.S. PATENT DOCUMENTS

| | | |
|---|---|---|
| 7,999,857 B2 | 8/2011 | Bunn et al. |
| 8,879,854 B2 | 11/2014 | Velusamy et al. |
| 2008/0052080 A1 | 2/2008 | Narayanan |
| 2008/0096533 A1 | 4/2008 | Manfredi et al. |
| 2011/0263946 A1 | 10/2011 | el Kaliouby et al. |
| 2012/0016678 A1 | 1/2012 | Gruber et al. |
| 2012/0173464 A1 | 7/2012 | Tur et al. |
| 2012/0259240 A1 | 10/2012 | Llewellynn et al. |
| 2013/0031074 A1 | 1/2013 | Vartanian et al. |
| 2013/0044233 A1 | 2/2013 | Bai |
| 2013/0121591 A1 | 5/2013 | Hill |
| 2013/0124257 A1* | 5/2013 | Schubert ............... G06Q 30/02 705/7.29 |

(Continued)

FOREIGN PATENT DOCUMENTS

| | | | | |
|---|---|---|---|---|
| JP | H06139044 A | * | 5/1994 | |
| KR | 20170027589 A | * | 3/2017 | ............... G06F 3/00 |
| WO | WO-2015067534 A1 | * | 5/2015 | ............... A61B 5/16 |

OTHER PUBLICATIONS

International Search Report and Written Opinion issued in International Application No. PCT/US2017/040358 dated Oct. 6, 2017 (10 pp).

*Primary Examiner* — Shreyans A Patel
(74) *Attorney, Agent, or Firm* — Young Basile Hanlon & MacFarlane, P.C.

(57) ABSTRACT

Modifying operation of an intelligent agent in response to facial expressions and/or emotions.

21 Claims, 8 Drawing Sheets

(56) References Cited

U.S. PATENT DOCUMENTS

| | | |
|---|---|---|
| 2013/0204664 A1* | 8/2013 | Romagnolo ....... G06Q 30/0203 |
| | | 705/7.32 |
| 2014/0050408 A1 | 2/2014 | Balasubramanian et al. |
| 2014/0136013 A1 | 5/2014 | Wolverton et al. |
| 2014/0139424 A1 | 5/2014 | Chang |
| 2014/0149177 A1* | 5/2014 | Frank ................... G06Q 10/06 |
| | | 705/7.29 |
| 2014/0365226 A1 | 12/2014 | Sinha |
| 2015/0015690 A1 | 1/2015 | Roh et al. |
| 2015/0340031 A1* | 11/2015 | Kim ....................... G10L 15/22 |
| | | 704/249 |
| 2015/0379981 A1 | 12/2015 | Balasubramanian et al. |
| 2015/0382147 A1 | 12/2015 | Clark et al. |
| 2016/0055236 A1* | 2/2016 | Frank ..................... G06F 40/35 |
| | | 707/748 |
| 2016/0228633 A1 | 8/2016 | Welsch et al. |
| 2016/0260143 A1* | 9/2016 | Ekambaram ........... G06F 3/012 |
| 2016/0379633 A1 | 12/2016 | Lehman et al. |
| 2017/0047063 A1 | 2/2017 | Ohmura et al. |
| 2017/0214951 A1* | 7/2017 | Chang .............. H04N 21/44226 |
| 2017/0358317 A1* | 12/2017 | James ................. H04W 12/065 |
| 2019/0348037 A1 | 11/2019 | Khullar et al. |

* cited by examiner

INTELLIGENT SOFTWARE AGENT

CROSS-REFERENCE TO RELATED APPLICATIONS

This application is a continuation of U.S. patent application Ser. No. 16/315,864 filed on Jan. 7, 2019, which is a national stage entry of International Application No. PCT/US2017/040358 filed on Jun. 30, 2017, which claims the benefit of U.S. Provisional Application No. 62/361,160 filed on Jul. 12, 2016, each of which is incorporated herein in its entirety by reference for all purposes.

TECHNICAL FIELD

The application relates generally to intelligent software agents.

BACKGROUND

Intelligent software agents can perform actions on behalf of a user. Actions can be performed in response to a natural-language user input, such as a sentence spoken by the user. In some circumstances, an action taken by an intelligent software agent may not match the action that the user intended.

SUMMARY

One aspect of the disclosed embodiments is a system. The system includes a microphone configured to receive an audio input, a camera configured to obtain one or more images, and one or more processors. The one or more processors are configured to perform a first action in response to the audio input, identify information representing a facial expression in the one or more images, determine whether the identified information representing the facial expression corresponds to a first reaction or a second reaction to the performing of the first action in response to the audio input, and in accordance with a determination that the identified information representing the facial expression corresponds to the second reaction, perform a second action different from the first action.

Another aspect of the disclosed embodiments is a method. The method includes obtaining, by a microphone, an audio input, and obtaining, by a camera, one or more images. The method also includes performing, by one or more processors, a first action in response to the audio input, and identifying, by the one or more processors, information representing a facial expression in the one or more images. The method also includes determining, by the one or more processors, whether the identified information representing the facial expression corresponds to a first reaction or a second reaction to the performing of the first action in response to the command input, and in accordance with a determination that the identified information representing the facial expression corresponds to the second reaction, performing a second action different from the first action.

Another aspect of the disclosed embodiments is a non-transitory computer-readable storage device including program instructions executable by one or more processors. The program instructions, when executed, cause the one or more processors to perform operations. The operations include obtaining, from a microphone, an audio input, and obtaining, from a camera, one or more images. The operations also include performing a first action in response to the audio input, and identifying information representing a facial expression in the one or more images. The operations also include determining whether the identified information representing the facial expression corresponds to a first reaction or a second reaction to the performing of the first action in response to the audio input, in accordance with a determination that the identified information representing the facial expression corresponds to the second reaction, performing a second action different from the first action, and in accordance with a determination that the identified information representing the facial expression corresponds to the first reaction, forgo performing the second action.

DETAILED DESCRIPTION

Figure 1:
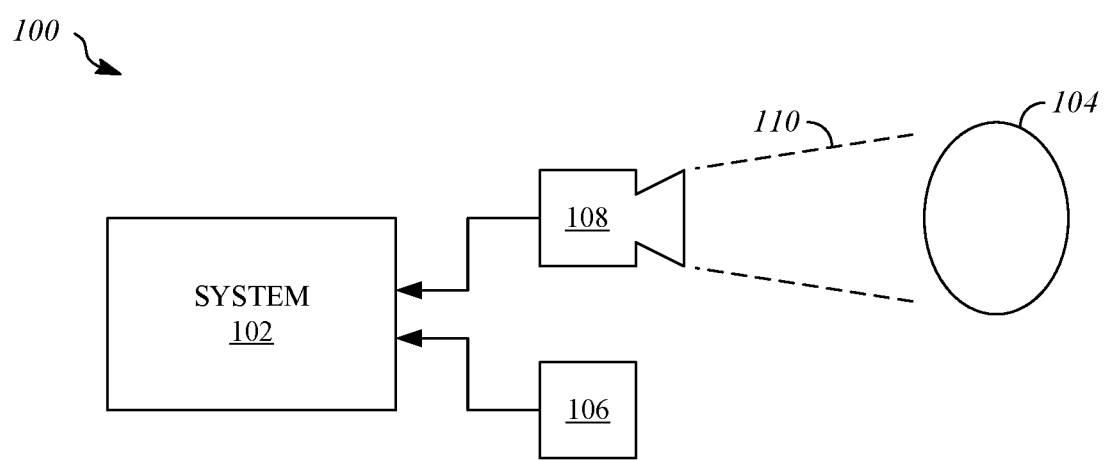
FIG. 1 is an illustration showing an exemplary environment.

FIG. 1 shows an environment 100 in which an exemplary system 102 having an intelligent software agent may be utilized. The system 102 is operable to receive a command input from a user 104. The command input may be expressed in natural language, such as a sentence that expresses an intention. The system 102 interprets the command input, and determines an inferred intention. The inferred intention may represent an action that the system 102 is able to take on the user's behalf. Thus, the system 102 may perform the action represented by the inferred intention.

In some embodiments, the command input is a speech input. The speech input may be signals and/or data that represent an utterance such as a spoken word, phrase, or sentence. The system 102 may receive an audio input signal that includes the speech input from an audio input device such as a microphone 106. In some embodiments, the command input is a text input. The system 102 may receive the text input from an input device such a physical keyboard or an on-screen keyboard. In some embodiments, the command input is expressed in a non-spoken language. As an example, the command input may be expressed in a sign language, such as American Sign Language. The non-spoken command input may be received by the system 102 using a visual input device that is operable to output one or more images, such as a video camera 108. A field of view 110 of the video camera 108 may be oriented to capture images representing a portion of the body of the user 104, such as the user's face and/or the user's hands.

Figure 2:
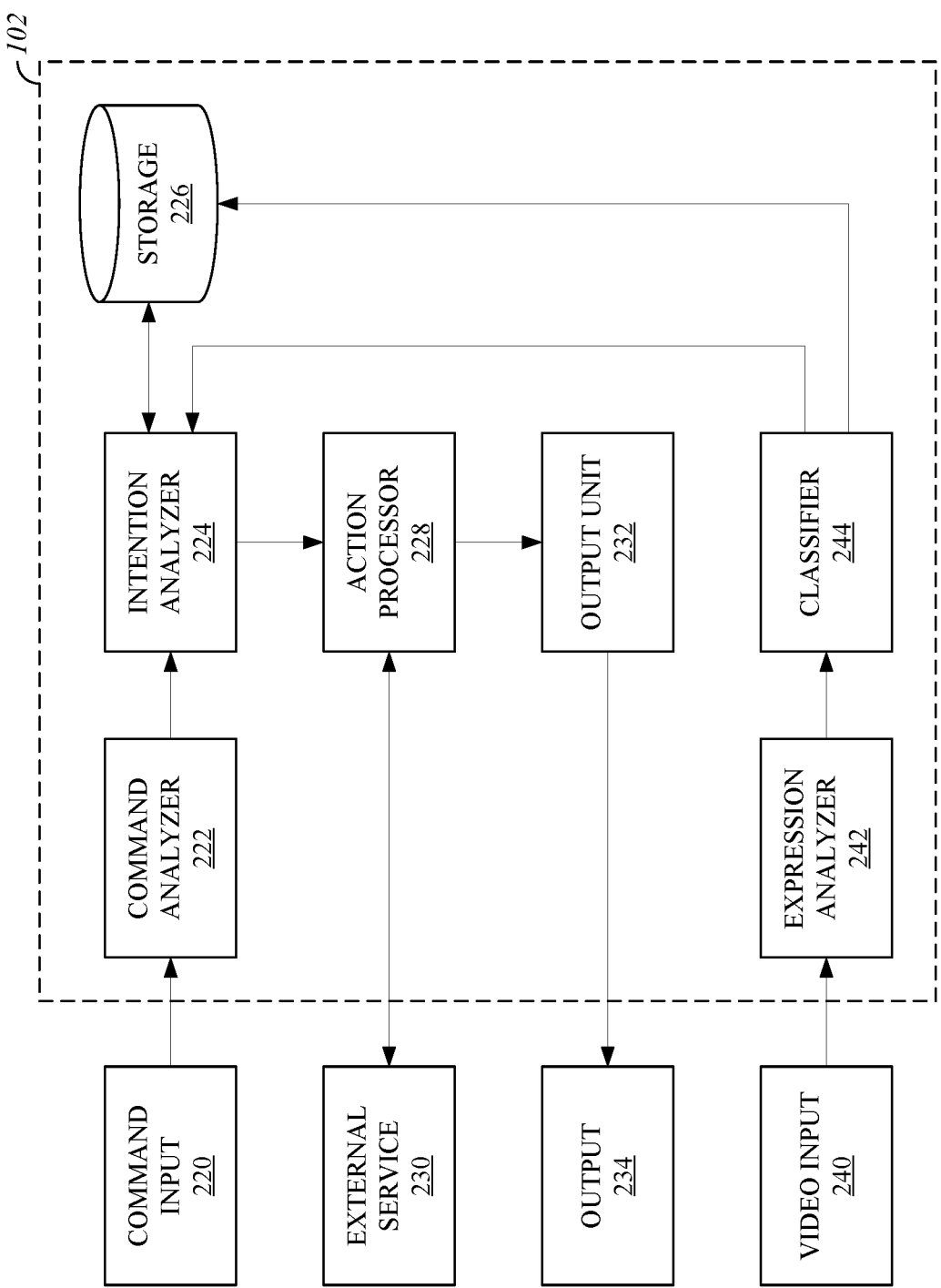
FIG. 2 is an illustration showing an exemplary system.

FIG. 2 shows components of the system 102. In the illustrated embodiment, a command input 220 is received as an input at a command analyzer 222. The command analyzer 222 may be a software module that is operable to analyze the command input 220, identify one or more portions of the command input 220 that can be converted into text or tokens, such as spoken or non-spoken language, and convert the command input into a form that can be understood by other components of the system 102, such as text or tokens. In some embodiments, the command analyzer 222 is a text-to speech convertor that converts a speech input into text. Many suitable methods are known for converting speech inputs into text, such as Hidden Markov Models and deep feedforward neural networks. In some embodiments, the speech analyzer provides the speech input converted into words or tokens as an output. In some embodiments, the command analyzer 222 utilizes machine-vision techniques to perceive non-spoken communication in an image or a series of images such as video frames, and provides the non-spoken command input converted into words or tokens as an output. In implementations where the command input 220 is a text input, no action may be needed by the command analyzer 222.

The system 102 includes an intention analyzer 224 that receives the command input subsequent to conversion by the command analyzer 222. The command input 220 may be received by the intention analyzer 224 as a text-based input. The intention analyzer 224 is operable to determine a user intention based on the command input and to select an action to be performed in response to the command input.

In some embodiments, the intention analyzer 224 identifies a relationship between the command input 220 and an action that can be performed by the system 102. Relationships between the command input 220 and actions can be identified using previously stored information. In some embodiments, the system 102 includes a storage device 226 where this and other items of information may be stored. In some embodiments, the intention analyzer 224 determines the user intention and/or selects the action by identifying a semantic relationship model that defines a relationship between the command input 220 and the action.

In a simple example, the intention analyzer 224 identifies the relationship between the command input and the action based on the presence of one or more words or tokens in the command input. In some embodiments, at least some of the words or tokens are classified into categories, and these categories are used to identify the relationship between the words or tokens and the action. In some embodiments, relationships between the command input and the actions are identified using an ontology that represents actions that can be performed by the system 102 and relates those actions to properties that may be present in the command input 220.

Each semantic relationship may have a strength that describes how weak or strong the relationship between the command input 220 and the user intention or action is. As an example, the strength of each semantic relationship may be expressed as a probability that a particular command input corresponds to a particular user intention or action to be performed. Semantic relationships may be strengthened or weakened by information received by the system, such as feedback information received after performing the action, as will be described herein.

The system 102 may include an action processor 228. The action processor 228 is operable to perform actions, such as by performing a first action in response to the command input. In some embodiments, the action processor receives information from the intention analyzer 224 that identifies an action to be performed. In response to receiving this information, the action processor 228 determines how to cause the desired action to be performed. The action processor 228 may cause the desired action may be performed by the system 102. As an example, the system 102 may be able to answer a question using information previously stored at the storage device 226. The action processor 228 may cause the desired action to be performed by an external service 230 that is accessed, for example, using an application programming interface (API). As examples, the external services 230 may include messaging, telephony, and calendar services.

The output unit 232 is operable to create a message for communication to the user and to communicate the message as output 234. As an example, the output 234 may be a message that responds to the command input by announcing, in the form or text or audible synthesized speech, the action that will be performed by the system 102 in response to the command input 220.

To receive feedback from the user without prompting the user, the system 102 may include an expression analyzer 242 and a classifier 244. A video input 240 is received as an input by the expression analyzer 242. The video input 240 may be obtained, for example from a video input device such as the video camera 108. The video input 240 may be, as examples, a portion of an image, an image, or a sequence of images.

The expression analyzer 242 may use facial recognition techniques to identify a human face in the video input 240, and to determine the identity of the user based on information that is, for example, accessed from the storage device 226. By determining the identity of the user, the expression analyzer 242 and/or other portions of the system 102 may access information associated with the user, such as a user profile.

The expression analyzer 242 is operable to recognize shapes and/or movement patterns in the video input 240 that correspond to portions of facial expressions. As an example, the face image in the video input 240 may be analyzed to determine whether particular muscles or muscle groups are activated by identifying shapes or motions that are associated with activation of a particular muscle or muscle group. Each of these shapes or movement patterns may be used by the expression analyzer to set or modify the strength of a signal that corresponds to a particular type or aspect of facial expression, and may be referred to herein as a facial expression signal. Since aspects of the face image in the video input 240 may correspond to multiple types of facial expressions, the expression analyzer 242 may output multiple facial expression signals each having a signal strength corresponding to a degree to which a particular type of facial expression is present in the video input 240. In some embodiments, the expression analyzer 242 utilizes automated emotion recognition techniques. In some embodiments, automated emotion recognition techniques may be implemented using a taxonomy of human facial movements categorized by their appearance on the face, such as the Facial Action Coding System.

The classification may represent a current reaction or emotional state of the user. The classification may be determined by comparing the facial expression signals output by the classifier 244 with information that is based on previously observed facial expression signals and known states. In some embodiments, machine-learning techniques are utilized to classify the facial expression signals. As examples, the classifier 244 may be implemented using a neural network, a deep neural network, or a support vector machine.

The classifier 244 may be operable to determine a current emotional state for the user. In some embodiments, the current emotional state determined by the classifier 244 is associated with a metric that describes a probability that the emotional state determined by the classifier 244 correctly represents the user's current emotional state. In other embodiments, the current emotional state determined by the classifier 244 is associated with a metric that describes a degree to which the user is experiencing the emotional state determined by the classifier 244.

In some embodiments, the system 102 determines a user reaction to the action performed by the action processor 228 or to the output 234. The user reaction may be represented by user reaction information. In some embodiments, the user reaction information is used to classify the reaction by category, such as a positive or negative reaction. In other embodiments, the user reaction information is expressed as one or more metrics such as a probability that the user reaction corresponds to a certain state such as positive or negative, or a degree to which the user is expressing the reaction. As used herein, determining that a reaction is positive may include determining that a probability of a positive reaction is above a threshold, and determining that a reaction is negative may include determining that a probability of a negative reaction is above a threshold.

The user reaction may be determined by the classifier 244 in the manner described with respect to determining the user's emotional state. However, the user reaction is measured during a time period that follows the action or output 234 of the system 102. In some embodiments, the start of the time periods in which the system 102 starts measuring the user reaction corresponds to the time at which the system 102 performs the action or the output 234. Thus, the action or output 234 is used as a trigger that starts monitoring and/or measuring of the user reaction.

The duration of the time period is chosen to represent the time in which the user may be expressing a reaction to the action or the output 234. In some embodiments, the time period is a predetermined length of time. In some embodiments, the time period is determined dynamically on a per-user basis based on previously observed reactions by the user. Accordingly, monitoring and/or measuring of the user reaction may end a predetermined time after performance of the action or the output 234 by the system 102.

In some embodiments, the classifier 244 may also be operable to analyze and classify emotional responses present in the command input 220, whether in the form of audio, video, or text, and the user reaction determined from the command input 220 may be utilized in the same manner described with respect to the video input 240.

Figure 3:
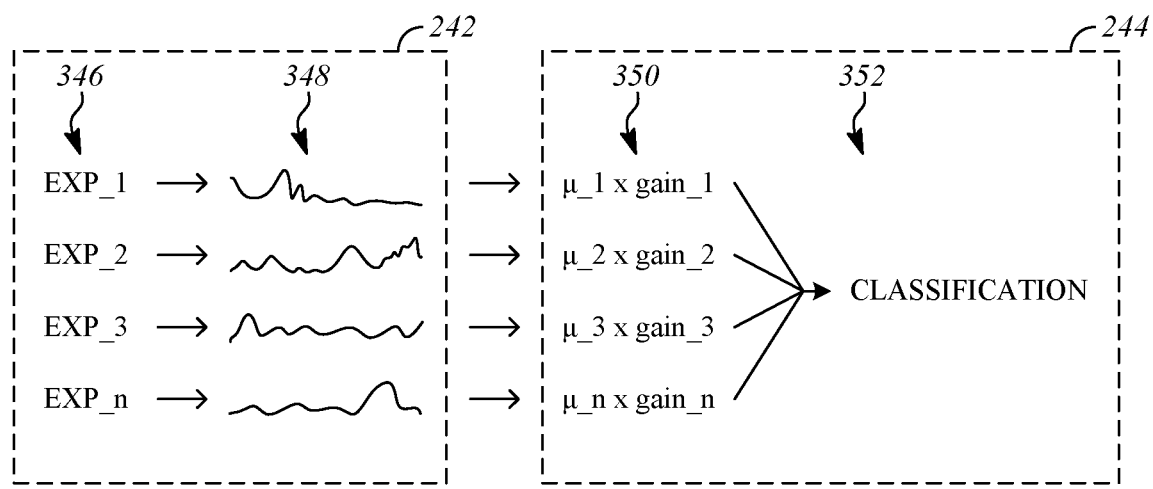
FIG. 3 is an illustration showing analysis and classification of expression signals.

As shown in FIG. 3, aspects of the appearance of the user's face may be categorized according to a plurality of expression types 346 by the expression analyzer 242. The expression types 346 may be classifications that describe positions and/or movements of the user's face and/or emotional states indicated by the positions and/or movements of the user's face. In the illustrated example, the expression types 346 are represented as EXP_1 through EXP_n. For each expression type, the expression analyzer 242 may output a respective facial expression signal 348, which changes over time in accordance with movements of the user's face.

The classifier 244 receives the facial expression signals 348 from the expression analyzer 242, as represented by $\mu\_1$ through $\mu\_n$ in FIG. 3. Using the facial expression signals 348, the classifier determines a classification 352 for the user's current facial expression.

Normalizing 350 may optionally be applied to the facial expression signals 348 prior to determining the classification. Normalizing 350 may include applying a non-linear normalization function. In some embodiments, the facial expression signals 348 may be normalized relative to a baseline. In some embodiments, the baseline may be a global baseline that is based on information obtained from other users' facial expressions. In some embodiments, the baseline may be user-specific, based in part or in whole on data obtained from the user. In some embodiments, normalizing 350 may be performed by applying gain values to the facial expression signals 348 from the expression analyzer 242, as represented by values gain_1 through gain_n in FIG. 3. In some implementations, the gain values are learned by the classifier 244 using machine learning techniques. In some implementations, normalizing 350 also includes applying an offset value to each of the facial expression signals.

The classification 352 is determined by the classifier 244 using the facial expression signals 348 subsequent to normalizing 350. The classification may be determined by the classifier 244 by using the normalized facial expression signals as inputs to a comparison or a model that is based on previously observed facial expression signals and known states, as previously described.

It should be understood that the functions and components of the system 102 may be implemented using multiple computing devices. In one embodiment, a first device implements a front end user interface, receives inputs, and generates outputs, while operations such as converting speech to text or selecting an action are performed using a second device, which may be a remote device that is accessed using a network.

Figure 4:
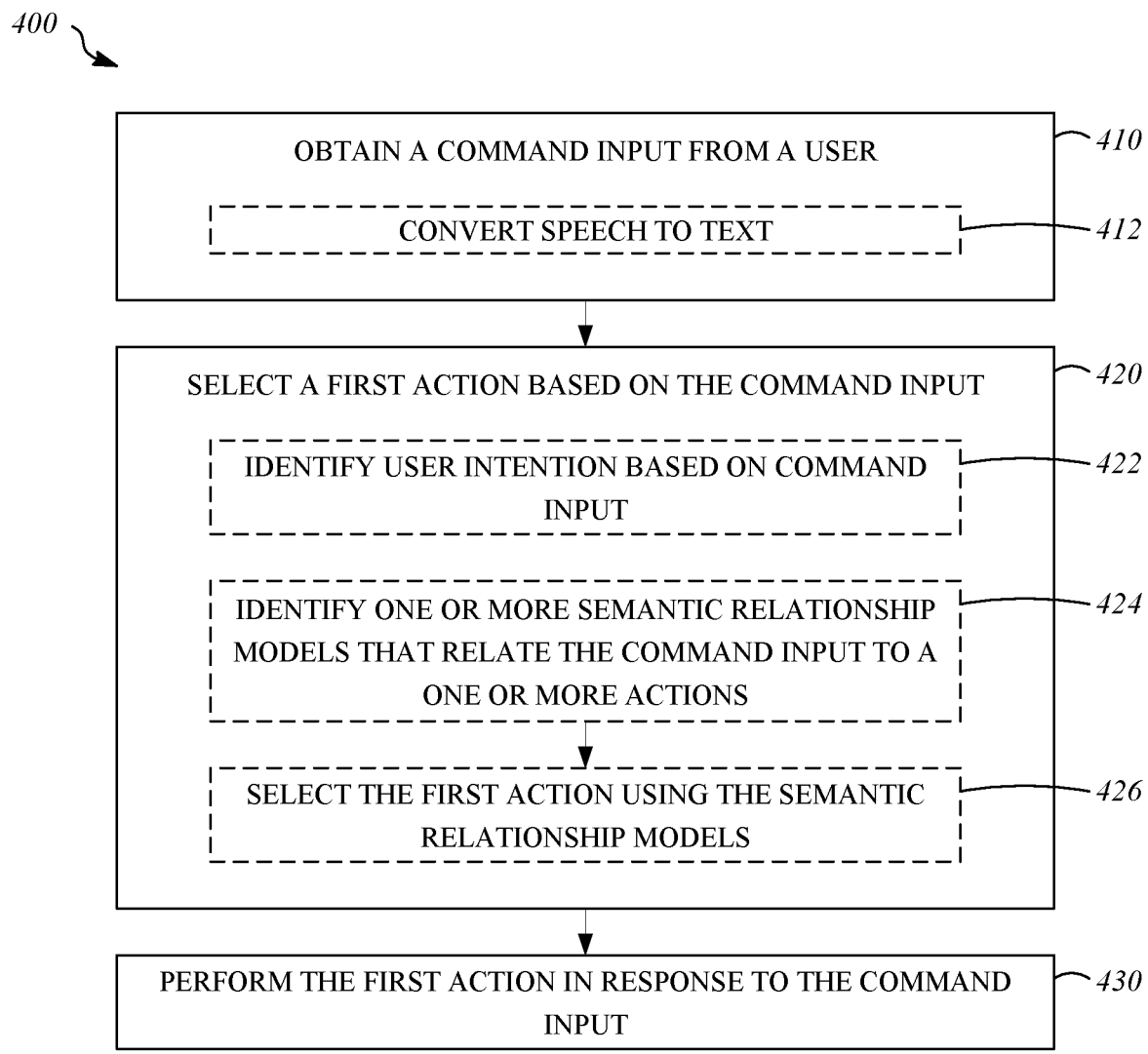
FIG. 4 is a flowchart showing an exemplary process.

FIG. 4 shows an exemplary process 400. The process 400 may be performed, for example, by the system 102. Operation 410 includes obtaining a command input from a user. The command input may be obtained using an input device such as a keyboard, a microphone, or a camera. In some embodiments, the command input may be a speech input that is obtained from an audio input device such as the microphone 106. In some embodiments, the command input is obtained by receiving information that represents the command input, such as by a transmission over a network or by accessing the information from a storage device.

In some embodiments, obtaining the command input in operation 410 further comprises operation 412, in which the command input is converted into text, such as by converting speech that is present in the audio input into text. Converting the command input into text in operation 412 may be performed, for example, as described with respect to the command analyzer 222.

Operation 420 includes selecting a first action based on the command input. Operation 420 may be performed, for example, in the manner described with respect to the intention analyzer 224.

In some embodiments, operation 420 further comprises identifying a user intention in operation 422 based on the command input. Identifying a user intention may be performed, for example, in the manner described with respect to the intention analyzer 224.

In some embodiments, operation 420 further comprises operation 424 and operation 426. In operation 424, one or more semantic relationship models are identified. The one or more semantic relationship models define a relationship between the command input and one or more actions. As an example, numerous semantic relationship models can be identified that describe a relationship between the command input and actions. Each of these semantic relationship models may be associated with a strength, which defines a probability that the command input represents a user intention to have the system 102 perform a particular action. In operation 426, a first action is selected using the semantic relationship models. As an example, the strongest (e.g., highest probability) semantic relationship model can be chosen for use by the system, resulting in selection of the action associated with that semantic relationship model being utilized as the first action.

In operation 430, the first action is performed in response to the command input. Performing the first action may include automated performance of one or more tasks on behalf of the user. The first action may be performed by the system 102 or by the external service 230 as directed by the system 102. Operation 430 can be performed, for example, as described with respect to the action processor 228.

Figure 5:
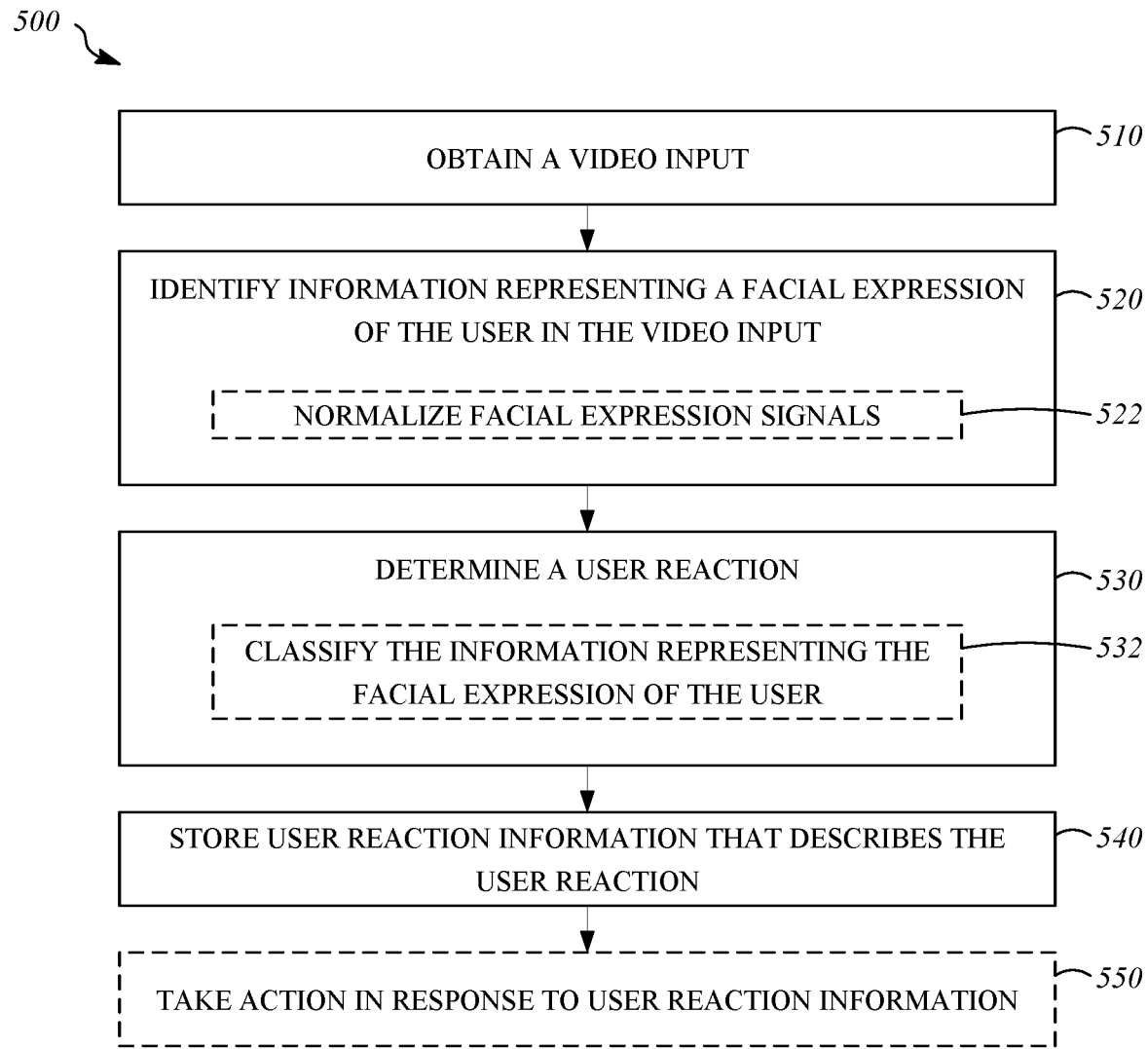
FIG. 5 is a flowchart showing an exemplary process.

FIG. 5 shows an exemplary process 500. Process 500 may be performed by the system 102 subsequent to process 400, for example, in order to obtain feedback resulting from performance of the first action in operation 430. In some embodiments, performance of the action in operation 430 is utilized as a start time for obtaining feedback from the user, since the system 102 is aware of the time at which the action is performed in operation 430.

Operation 510 includes obtaining a video input. As an example, the video input 240 may be received from a video input device such as the video camera 108.

Operation 520 includes identifying information representing a facial expression of the user in the video input. Identifying information representing a facial expression may be performed as described with respect the expression analyzer 242.

In some embodiments, operation 520 further comprises operation 522. In operation 522, the information representing the facial expression of the user in the video input includes a plurality of facial expression signals that each represent an aspect of the user's facial expression, and operation 522 includes normalizing the facial expression signals.

Operation 530 includes determining a user reaction. In some embodiments, determining a user reaction can be performed by comparing the information representing the facial expression of the user with stored information that describes relationships between facial expressions and reactions. Operation 530 is performed using the information obtained at operation 520 and optionally using the information obtained at operation 522. Operation 530 may utilize information that begins at a first time point when an action is performed by the system 102, such as the action performed at operation 430. The information may include a time period that extends over a predetermined time period that is static in duration or is determined dynamically based on user behavior.

In some embodiments, operation 530 further comprises operation 532. Operation 532 includes classifying the information representing the facial expressions of the user. Classifying the facial expressions of the user can be performed, for example, as described with respect to the classifier 244.

Operation 540 includes storing user reaction information that describes the user reaction. As an example, the system 102 may store the user reaction information using the storage device 226.

In some embodiments, process 500 includes operation 550. Operation 550 includes taking action in response to the user reaction information. As an example, operation 550 may include modifying an aspect of operation of the system 102 in response to the user's facial expressions. In some embodiments, modification of the system 102 performed in operation 550 may change the results generated by the process 400, such as by modifying the information used by the intention analyzer 224 to select the action based on the command input. This may cause the same user input to cause performance of a different action by the system 102 during subsequent usage of the system 102 by the user, as a result of the feedback information provided by the process 500.

As shown in the foregoing operations, by implementing the process 500, the system 102 may start monitoring a facial expression that is related to an action after performing the action, and continue monitoring the facial expression that is related to the action after a predetermined time period. The system 102 may then store and/or action on the information obtained from the facial expression.

Figure 6:
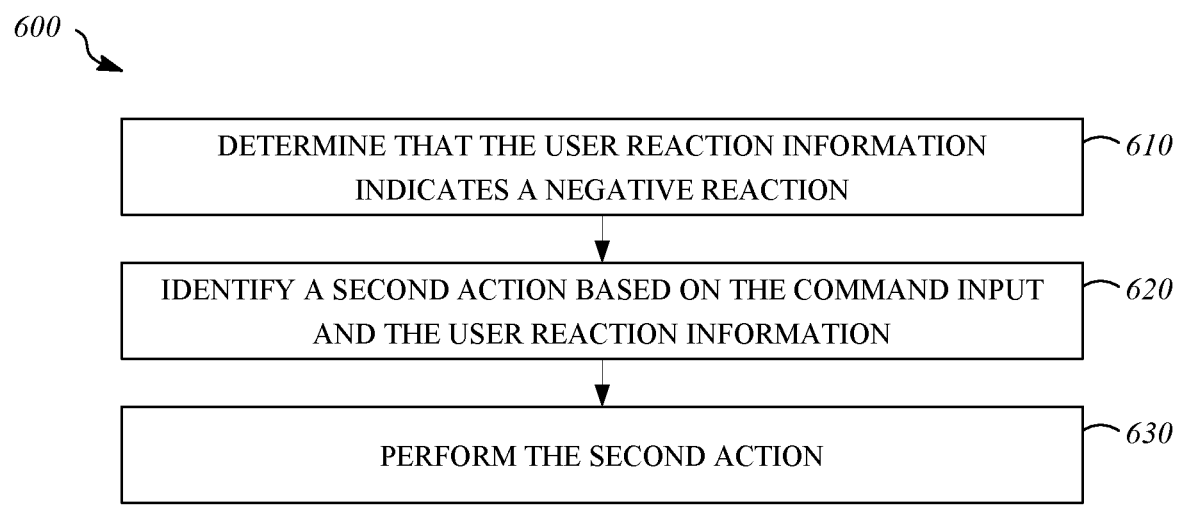
FIG. 6 is a flowchart showing an exemplary process.

FIG. 6 shows an exemplary process 600. Process 600 may be performed, for example, as part of or in lieu of taking action in response to the user reaction information in operation 550 of process 500.

Operation 610 includes determining that the user reaction information indicates a negative reaction. As explained with respect to the classifier 244, this can be performed by, for example, classifying user reaction information based on known user reaction states that were previously made available to the system 102, and may be expressed as a category or a probability that the user's reaction is a negative reaction.

Operation 620 includes identifying a second action based on the command input and the user reaction information. The second action is identified in the same manner that the first action was identified. However, the system 102 selects the second action with knowledge that the first action was an incorrect response to the command input. In some embodiments, the system 102 chooses an action that, at the time of selection of the first action, was ranked as being the second most likely user-intended action. In other embodiments, the second action is selected in the manner described with respect to operation 426, but subsequent to modification of information used by the system 102 to select actions, such as the semantic relationship models.

In some embodiments, the second action is identified in operation 620 based on a second command input that is received from the user immediately after the system 102 performs the first action. The second command input may repeat a request that was present in the first command input, either in identical phrasing or in modified phrasing. The request is an expression of an intention for the system 102 to respond in a particular way. The request may be expressed as a verbal command. There may be many different verbal commands that can be formed to express the same intention, and these various expressions are considered the same request. Thus, in some embodiments, a first command input represents a request, and a second command input received from the user after the system performs the first action represents the same request. The system 102 can determine that repetition of the request indicates that the first action did not correspond to the user's intention, and therefore is a negative reaction. In response, to the second command input and the determination that repetition of the request corresponds to a negative reaction, the system 102 can perform the second action in response to the second command input.

In operation 630, the second action is performed by the system. To collect further feedback information, the process 500 may be performed subsequent to performing the second action to determine whether the second action was correct or incorrect.

In some embodiments, if the system 102 determines, at operation 610, that the user's reaction is a positive reaction, the system 102 may, in accordance with the determination that the user reaction corresponds to a positive reaction, forgo performance of the second action by omitting operations 620 and 630.

Figure 7:
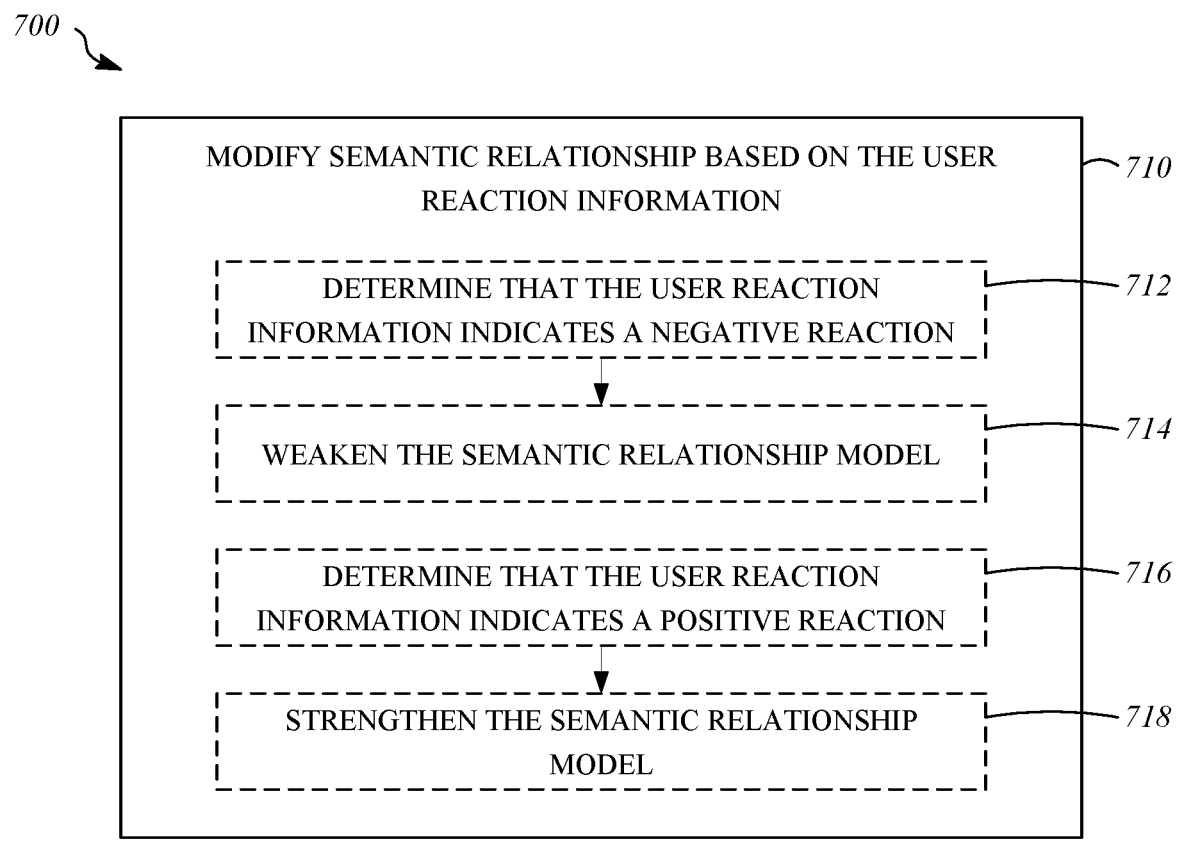
FIG. 7 is a flowchart showing an exemplary process.

FIG. 7 shows an exemplary process 700. Process 700 may be performed, for example, as part of or in lieu of taking action in response to the user reaction information in operation 550 of process 500.

Operation 710 includes modifying a semantic relationship between the command input and the action based on the user reaction information.

In some embodiments, operation 710 includes operation 712 and operation 714. Operation 712 includes determining that the user reaction information indicates a negative reaction and is similar to operation 620. In response to determining that the user reaction information indicates the negative reaction, operation 714 includes weakening the semantic relationship model between the command input and the action.

In some embodiments, operation 710 includes operation 716 and operation 718. Operation 716 includes determining that the user reaction information indicates a positive reaction and is similar to operation 712 except that operation 712 tests for the opposite reaction. In response to determining that the user reaction information indicates the positive reaction, operation 718 includes strengthening the semantic relationship model between the command input and the action.

Figure 8:
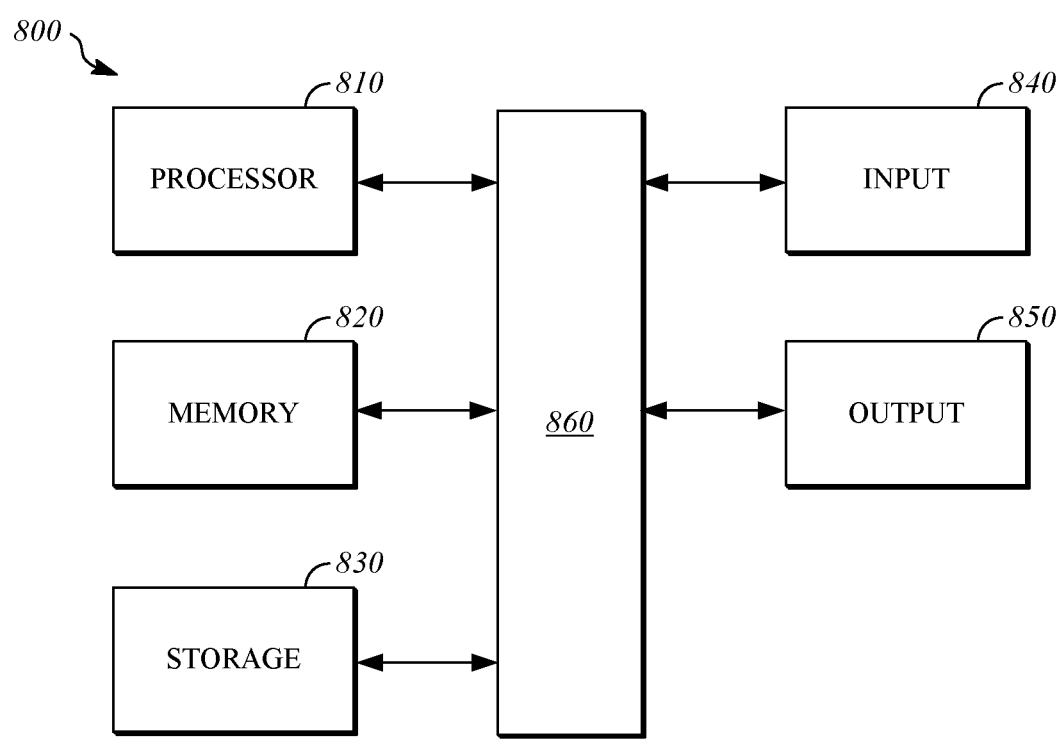
FIG. 8 is an illustration showing an exemplary hardware configuration for a controller.

FIG. 8 shows an exemplary hardware configuration for a controller 800 that may be used to implement the system 102. The controller 800 may include a processor 810, memory 820, a storage device 830, one or more input devices 840, and one or more output devices 850. The controller 800 may include a bus 860 or a similar device to interconnect the components for communication. The processor 810 is operable to execute computer program instructions and perform operations described by the computer program instructions. As an example, the processor 810 may be a conventional device such as a central processing unit. The memory 820 may be a volatile, high-speed, short-term information storage device such as a random-access memory module. The storage device 830 may be a non-volatile information storage device such as a hard drive or a solid-state drive. The input devices 840 may include any type of human-machine interface such as buttons, switches, a keyboard, a mouse, a touchscreen input device, a gestural input device, or an audio input device. The output devices 850 may include any type of device operable to provide an indication to a user regarding an operating state, such as a display screen or an audio output.

What is claimed is:

1. A system comprising:
   one or more sensors; and
   one or more processors configured to:
   obtain a request input using the one or more sensors,
   analyze the request input using an action model to select a first action, wherein the action model defines a relationship between the request input and the first action,
   output a notification prior to performing the first action,
   obtain a reaction input in response to the notification,
   analyze the reaction input using a reaction classifier to determine an emotional response of a user,
   in accordance with a determination that the emotional response of the user corresponds to a positive emotional response, perform the first action and modify the action model in a manner that strengthens the relationship between the request input and the first action, and
   in accordance with a determination that the emotional response of the user corresponds to a negative emotional response, forgo performance of the first action and modify the action model in a manner that weakens the relationship between the request input and the first action.

2. The system of claim 1, wherein the one or more processors are further configured to:
   in accordance with a determination that the emotional response of the user corresponds to a negative emotional response, analyze the request input and the reaction input to select a second action.

3. The system of claim 1, wherein the one or more sensors include a microphone that is configured to obtain the request input and a camera that is configured to obtain the reaction input.

4. A method comprising:
   obtaining a request input;
   analyzing the request input using an action model to select a first action, wherein the action model defines a relationship between the request input and the first action;
   outputting a notification prior to performing the first action;
   obtaining a reaction input in response to the notification;
   analyzing the reaction input using a reaction classifier to determine an emotional response of a user;
   in accordance with a determination that the emotional response of the user corresponds to a positive emotional response, performing the first action and modifying the action model in a manner that strengthens the relationship between the request input and the first action; and
   in accordance with a determination that the emotional response of the user corresponds to a negative emotional response, forgoing performance of the first action and modifying the action model in a manner that weakens the relationship between the request input and the first action.

5. The method of claim 4, further comprising:
   in accordance with a determination that the emotional response of the user corresponds to a negative emotional response, analyzing the request input and the reaction input to select a second action.

6. The method of claim 4, wherein obtaining the request input comprises obtaining the request input using a microphone and obtaining the reaction input comprises obtaining the reaction input using a camera.

7. A non-transitory computer-readable storage device including program instructions executable by one or more processors that, when executed, cause the one or more processors to perform operations, the operations comprising:
   obtaining a request input;
   analyzing the request input using an action model to select a first action, wherein the action model defines a relationship between the request input and the first action;
   outputting a notification prior to performing the first action;
   obtaining a reaction input in response to the notification;
   analyzing the reaction input using a reaction classifier to determine an emotional response of a user;
   in accordance with a determination that the emotional response of the user corresponds to a positive emotional response, performing the first action and modifying the action model in a manner that strengthens the relationship between the request input and the first action; and in accordance with a determination that the emotional response of the user corresponds to a negative emotional response, forgoing performance of the first action and modifying the action model in a manner that weakens the relationship between the request input and the first action.

8. The non-transitory computer-readable storage device of claim 7, further comprising:
in accordance with a determination that the emotional response of the user corresponds to a negative emotional response, analyzing the request input and the reaction input to select a second action.

9. The non-transitory computer-readable storage device of claim 7, wherein obtaining the request input comprises obtaining the request input using a microphone and obtaining the reaction input comprises obtaining the reaction input using a camera.

10. The system of claim 1, wherein the relationship between the request input and the first action defined by the action model is a probability that the request input corresponds to a user intention that the first action be performed.

11. The system of claim 1, wherein the relationship between the request input and the action is identified based on the presence of one or more words in the request input.

12. The system of claim 1, wherein the reaction input is obtained by monitoring a user reaction during a predetermined time period subsequent to the notification.

13. The system of claim 2, wherein analysis of the request input and the reaction input to select the second action is performed subsequent to modification of the action model to weaken the relationship between the request input and the first action.

14. The method of claim 4, wherein the relationship between the request input and the first action defined by the action model is a probability that the request input corresponds to a user intention that the first action be performed.

15. The method of claim 4, wherein the relationship between the request input and the action is identified based on the presence of one or more words in the request input.

16. The method of claim 4, wherein obtaining the reaction input comprises monitoring a user reaction during a predetermined time period subsequent to outputting the notification.

17. The method of claim 5, wherein analyzing the request input and the reaction input to select the second action is performed subsequent to modifying the action model to weaken the relationship between the request input and the first action.

18. The non-transitory computer-readable storage device of claim 7, wherein the relationship between the request input and the first action defined by the action model is a probability that the request input corresponds to a user intention that the first action be performed.

19. The non-transitory computer-readable storage device of claim 7, wherein the relationship between the request input and the action is identified based on the presence of one or more words in the request input.

20. The non-transitory computer-readable storage device of claim 7, wherein obtaining the reaction input comprises monitoring a user reaction during a predetermined time period subsequent to outputting the notification.

21. The non-transitory computer-readable storage device of claim 8, wherein analyzing the request input and the reaction input to select the second action is performed subsequent to modifying the action model to weaken the relationship between the request input and the first action.

* * * * *